(12) United States Patent
Inagaki

(10) Patent No.: US 7,664,582 B2
(45) Date of Patent: Feb. 16, 2010

(54) AUTOMOBILE AND CONTROL METHOD OF AUTOMOBILE

(75) Inventor: Shoji Inagaki, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 637 days.

(21) Appl. No.: 10/581,280

(22) PCT Filed: Dec. 3, 2004

(86) PCT No.: PCT/JP2004/018446

§ 371 (c)(1), (2), (4) Date: Jun. 1, 2006

(87) PCT Pub. No.: WO2005/053992

PCT Pub. Date: Jun. 16, 2005

(65) Prior Publication Data

US 2007/0129866 A1 Jun. 7, 2007

(30) Foreign Application Priority Data

Dec. 5, 2003 (JP) .............................. 2003-407549

(51) Int. Cl.
B62D 6/00 (2006.01)
(52) U.S. Cl. ........................................ 701/38; 180/233
(58) Field of Classification Search ................ 701/38, 701/70, 72, 75, 48; 180/233, 197; 303/140
See application file for complete search history.

(56) References Cited

U.S. PATENT DOCUMENTS 5,388,658 A 2/1995 Ando et al.
5,408,411 A * 4/1995 Nakamura et al. ............ 701/48
5,701,247 A * 12/1997 Sasaki .............................. 701/1
6,131,054 A * 10/2000 Shibahata ........................ 701/1
2001/0044691 A1 11/2001 Ishizu et al.
2003/0125864 A1 * 7/2003 Banno et al. ................... 701/84
2004/0093144 A1 5/2004 Ishizu et al.

FOREIGN PATENT DOCUMENTS

| DE | 41 33 060 A1 | 4/1993 |
|---|---|---|
| EP | 1 155 900 A2 | 11/2001 |
| JP | B2-6-27516 | 4/1994 |
| JP | B2 2518445 | 5/1996 |
| JP | B2 2518448 | 5/1996 |
| JP | B2-2595762 | 1/1997 |
| JP | A 10-54264 | 2/1998 |
| JP | B2 2942566 | 6/1999 |

* cited by examiner

Primary Examiner—Dalena Tran
(74) Attorney, Agent, or Firm—Oliff & Berridge, PLC

(57) ABSTRACT

In an automobile of the invention, a cornering drag estimator 61 estimates a cornering drag from measurements of steering angle θ and vehicle speed V. A gain multiplier 62 multiplies the estimated cornering drag by a preset gain K to reduce the estimated cornering drag. A phase adjuster 63 adjusts the phase of the rest of the estimated and reduced cornering drag. An implementation system 70 receives the sum of the output of the gain multiplier 62 and the output of the phase adjuster 63 and regulates the throttle opening of an engine according to the received sum. This adjusts the phase and the degree of reduction of the estimated cornering drag. This arrangement of the invention attains the adequate levels of pitching and rolling, which may be caused in the vehicle in the turning state.

14 Claims, 6 Drawing Sheets

AUTOMOBILE AND CONTROL METHOD OF AUTOMOBILE

TECHNICAL FIELD

The present invention relates to an automobile and a control method of the automobile.

BACKGROUND ART

Some automobiles have been proposed to set a target driving torque based on a cornering drag, which varies with a variation in lateral acceleration in a turning state (see, for example, Japanese Patent Publication No. 2518445). This proposed automobile specifies a target acceleration in a vehicle longitudinal direction according to the magnitude of the lateral acceleration in the turning state and sets a target driving torque by adding the specified target acceleration to a road load torque based on the cornering drag, which depends upon the lateral acceleration. The engine of the automobile is controlled to attain the preset level of the target driving torque. This technique aims to attain a quick turn of the vehicle without setting an excessively small value to the target driving torque even in a high level range of the lateral acceleration.

DISCLOSURE OF THE INVENTION

The prior art automobile sets the target driving torque to include the road load torque based on the cornering drag, but does not take into account vibrations of the vehicle in the vehicle longitudinal direction (pitching) and vibrations of the vehicle in the vehicle lateral direction (rolling) in the turning state. The composite factors of such pitching and rolling act on the vehicle in the turning state and may make the driver and the passengers on the vehicle uncomfortable.

The automobile and the corresponding automobile control method of the invention thus aim to attain adequate levels of pitching and rolling, which may be caused in the vehicle in the turning state.

The automobile and the corresponding automobile control method of the invention have the arrangements discussed below, in order to attain at least part of the above and the other related objects.

An automobile of the invention is driven with a driving force from a driving source, and includes: a deceleration force estimation module that estimates a deceleration force in a vehicle longitudinal direction, which is caused by steering of the vehicle and is applied to reduce speed of the vehicle; a control value calculation module that calculates an adjustment control value used to adjust a steering-based acceleration, which is caused by steering of the vehicle and is applied to the vehicle, from the estimated deceleration force; and a driving control module that drives and controls the driving source to ensure output of a driving force to an axle based on a drive change demand of the vehicle and the calculated adjustment control value.

The automobile of the invention estimates the deceleration force in the vehicle longitudinal direction, which is caused by steering of the vehicle and is applied to reduce the speed of the vehicle, calculates the adjustment control value used to adjust the steering-based acceleration, which is caused by steering of the vehicle and is applied to the vehicle, from the estimated deceleration force, and drives and controls the driving source to ensure output of the driving force to the axle based on the drive change demand of the vehicle and the calculated adjustment control value. Calculation of the adjustment control value to adjust the steering-based acceleration to a desired level effectively attains the adequate levels of pitching and rolling caused by the steering-based acceleration. Here the 'driving source' is, for example, at least one of an internal combustion engine and a motor. The terminology 'drive change demand of the vehicle' includes both the driver's manipulation-based demand and an automatic control demand without the driver's manipulation. The terminology 'axle' includes a shaft linked with wheels, as well as wheels themselves.

In the automobile of the invention, the control value calculation module may include a magnitude regulator that regulates magnitude of a longitudinal acceleration in the vehicle longitudinal direction out of the steering-based acceleration, and calculate the adjustment control value, based on the regulation by the magnitude regulator. Regulation of the magnitude of the longitudinal acceleration attains the more adequate levels of pitching and rolling of the vehicle caused by the steering-based acceleration. In this case, the magnitude regulator may regulate the magnitude of the longitudinal acceleration to decrease magnitude of a lateral acceleration in a vehicle lateral direction out of the steering-based acceleration. This arrangement desirably controls the vibrations due to the lateral acceleration. Further, the magnitude regulator may decrease the magnitude of the longitudinal acceleration. This arrangement desirably controls the vibrations due to the longitudinal acceleration. Here the terminology 'decrease the magnitude of the longitudinal acceleration' includes decreasing the magnitude of the longitudinal acceleration to a value '0'. In addition, the magnitude regulator may regulate the magnitude of the longitudinal acceleration to set at least one of a pitching level and a rolling level of the vehicle, which is caused by the steering-based acceleration, to a specified level. The specified level is set in advance according to the characteristics of the automobile. The pitching and rolling levels of the automobile caused by the steering-based acceleration are thus set to desired levels adequate for the characteristics of the automobile. Moreover, the magnitude regulator may regulate the magnitude of the longitudinal acceleration to reduce at least one of a pitching level and a rolling level of the vehicle, which is caused by the steering-based acceleration. This arrangement reduces the pitching and rolling levels of the vehicle caused by the steering-based acceleration. Regulation of the degree of reduction ensures the more adequate levels of pitching and rolling. Here the terminology 'reduction of the pitching level and the rolling level' includes complete elimination of pitching and rolling.

In the automobile of the invention, the control value calculation module may include a phase adjuster that adjusts phases of a longitudinal acceleration in the vehicle longitudinal direction and a lateral acceleration in a vehicle lateral direction out of the steering-based acceleration, and calculate the adjustment control value, based on the adjustment by the phase adjuster. Adjustment of the phases of the longitudinal acceleration and the lateral acceleration ensures the more adequate levels of pitching and rolling of the vehicle caused by the steering-based acceleration. In this case, the phase adjuster may adjust the phase of the longitudinal acceleration to decrease magnitude of the lateral acceleration. This arrangement desirably controls the vibrations due to the lateral acceleration. Further, the phase adjuster may lag the phase of the longitudinal acceleration relative to the phase of the lateral acceleration. Lag of the phases of the longitudinal acceleration relative to the lateral acceleration ensures the more adequate levels of pitching and rolling of the vehicle caused by the steering-based acceleration. In addition, the phase adjuster may adjust the phase of the longitudinal acceleration to set at least one of a pitching level and a rolling level of the vehicle, which is caused by the steering-based acceleration, to a specified level. The specified level is set in advance according to the characteristics of the automobile. The pitching and rolling levels of the automobile caused by the steering-based acceleration are thus set to desired levels adequate for the characteristics of the automobile. Moreover, the phase adjuster may adjust the phase of the longitudinal acceleration to reduce at least one of a pitching level and a rolling level of the vehicle, which is caused by the steering-based acceleration. This arrangement reduces the pitching and rolling levels of the vehicle caused by the steering-based acceleration. Regulation of the degree of reduction ensures the more adequate levels of pitching and rolling. Here the terminology 'reduction of the pitching level and the rolling level', includes complete elimination of pitching and rolling.

The automobile of the invention may further include: a steering angle detection module that detects a steering angle; and a vehicle speed measurement module that measures a vehicle speed, and the deceleration force estimation module may estimate the deceleration force, based on the detected steering angle and the measured vehicle speed. In this case, the deceleration force estimation module may estimate the deceleration force to increase with an increase in the detected steering angle and to increase with an increase in the measured vehicle speed. This arrangement ensures adequate estimation of the deceleration force.

An automobile control method of the invention is a method of controlling an automobile, which is driven with a driving force from a driving source, and includes the steps of: (a) estimating a deceleration force in a vehicle longitudinal direction, which is caused by steering of the vehicle and is applied to reduce speed of the vehicle; (b) calculating an adjustment control value used to adjust a steering-based acceleration, which is caused by steering of the vehicle and is applied to the vehicle, from the estimated deceleration force; and (c) driving and controlling the driving source to ensure output of a driving force to an axle based on a drive change demand of the vehicle and the calculated adjustment control value.

The automobile control method of the invention estimates the deceleration force in the vehicle longitudinal direction, which is caused by steering of the vehicle and is applied to reduce the speed of the vehicle, calculates the adjustment control value used to adjust the steering-based acceleration, which is caused by steering of the vehicle and is applied to the vehicle, from the estimated deceleration force, and drives and controls the driving source to ensure output of the driving force to the axle based on the drive change demand of the vehicle and the calculated adjustment control value. Calculation of the adjustment control value to adjust the steering-based acceleration to a desired level effectively attains the adequate levels of pitching and rolling caused by the steering-based acceleration. Here the 'driving source' is, for example, at least one of an internal combustion engine and a motor. The terminology 'drive change demand of the vehicle' includes both the driver's manipulation-based demand and an automatic control demand without the driver's manipulation. The terminology 'axle' includes a shaft linked with wheels, as well as wheels themselves.

In the automobile control method of the invention, the step (b) may regulate phase and magnitude of a longitudinal acceleration in the vehicle longitudinal direction out of the steering-based acceleration, so as to calculate the adjustment control value. Regulation of the phase and the magnitude of the longitudinal acceleration attains the more adequate levels of pitching and rolling of the vehicle caused by the steering-based acceleration. Further, the step (b) may calculate the adjustment control value to set at least one of a pitching level and a rolling level of the vehicle, which is caused by the steering-based acceleration, to a specified level. The specified level is set in advance according to the characteristics of the automobile. The pitching and rolling levels of the automobile caused by the steering-based acceleration are thus set to desired levels adequate for the characteristics of the automobile. Moreover, the step (b) may calculate the adjustment control value to reduce at least one of a pitching level and a rolling level of the vehicle, which is caused by the steering-based acceleration. Regulation of the degree of reduction ensures the more adequate levels of pitching and rolling. Here the terminology 'reduction of the pitching level and the rolling level' includes complete elimination of pitching and rolling.

BEST MODES OF CARRYING OUT THE INVENTION

Figure 1:
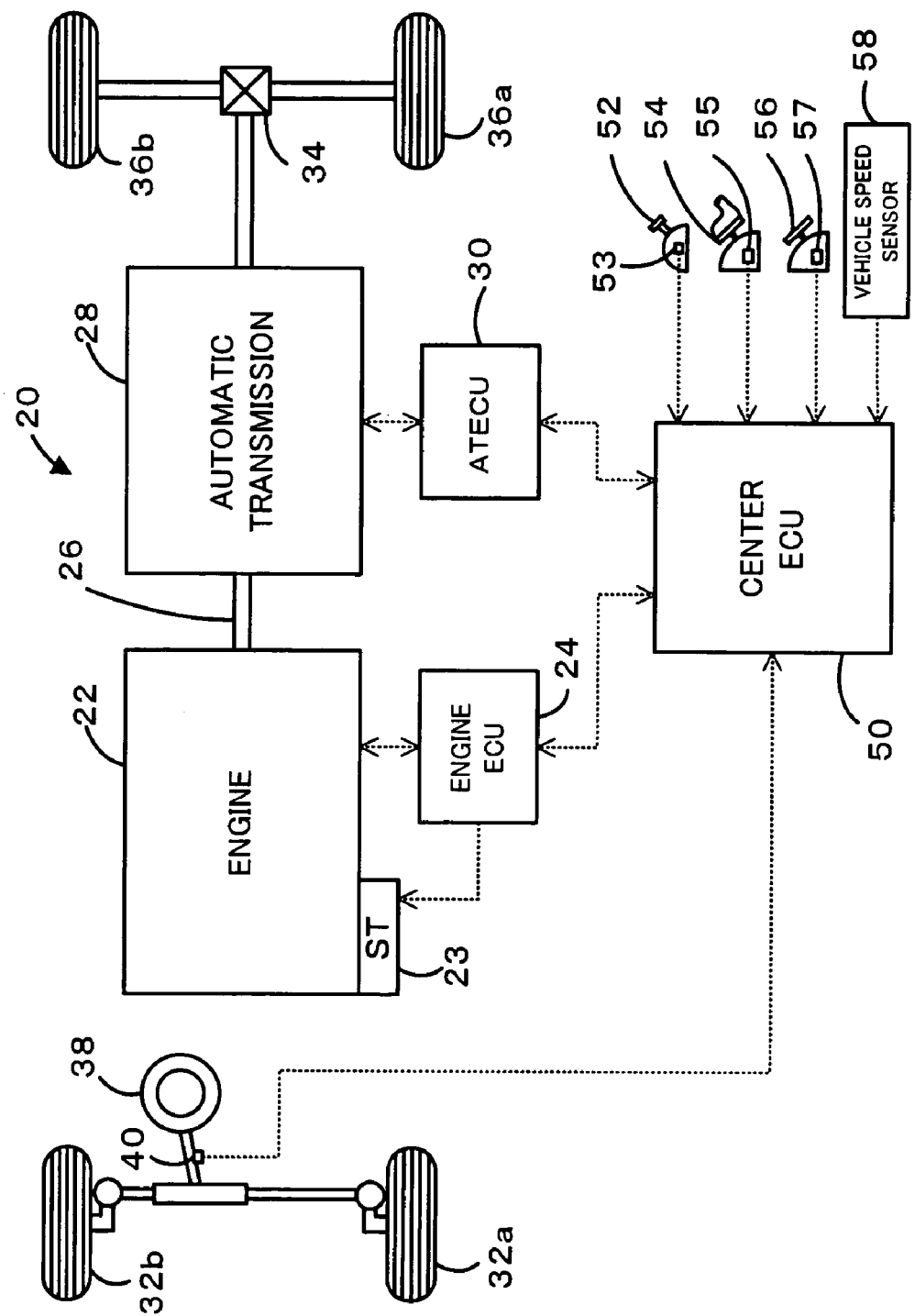
FIG. 1 schematically illustrates the configuration of an automobile 20 in one embodiment of the invention.

One mode of carrying out the invention is discussed below as a preferred embodiment. FIG. 1 schematically illustrates the configuration of an automobile 20 in one embodiment of the invention. As illustrated, the automobile 20 of the embodiment has an engine 22 that is started by a starter motor 23 and is driven with gasoline, an engine electronic control unit (hereafter referred to as engine ECU) 24 that directly controls the operations of the engine 22, an automatic transmission 28 that converts power output from the engine 22 to a crankshaft 26 and transmits the converted power to drive wheels or rear wheels 36a and 36b via a differential gear 34, an automatic transmission electronic control unit (hereafter referred to as ATECU) 30 that controls gear changes of the automatic transmission 28, and a center electronic control unit (hereafter referred to as center ECU) 50 that controls the whole vehicle.

The engine ECU 24 is constructed as a microcomputer including a CPU as the center element, although not being specifically illustrated. The engine ECU 24 receives signals output from various sensors that detect the driving conditions of the engine 22, for example, an air flow meter that measures the amount of intake air, a crank position sensor that detects the rotating position of the crankshaft 26, and a throttle valve position sensor that measures the opening of a throttle valve. The engine ECU 24 executes an air intake adjustment control to adjust the opening of the throttle valve for regulation of the amount of intake air, a variable intake valve timing control to vary the open-close timing of an intake valve, a fuel injection control to regulate the time of fuel injection, and an ignition control to regulate the ignition timing, so as to control the operations of the engine 22. The engine ECU 24 establishes communication with the center ECU 50. The engine ECU 24 starts and stops the engine 22 and controls the operations of the engine 22 in response to control signals from the center ECU 50, while outputting data regarding the driving conditions of the engine 22 to the center ECU 50 according to the requirements.

The ATECU 30 is also constructed as a microcomputer including a CPU as the center element, although not being specifically illustrated. The ATECU 30 couples and releases clutches and brakes as combinations of multiple planetary gears to change the speed setting in the automatic transmission 28 according to measurement values of vehicle speed V and accelerator opening Acc, so as to control the automatic transmission 28. The ATECU 30 also establishes communication with the center ECU 50. The ATECU 30 changes the speed setting in the automatic transmission 28 in response to control signals from the center ECU 50, while outputting data regarding the conditions of the automatic transmission 28 to the center ECU 50 according to the requirements.

The center ECU 50 is also constructed as a microcomputer including a CPU as the center element. The center ECU 50 inputs data from various sensors as well as data from the engine ECU 24 and the ATECU 30, while sending control signals to the engine ECU 24 and the ATECU 30 to control the operations of the whole vehicle on the basis of the input data. The data input into the center ECU 50 include a steering angle $\theta$ or a rotation angle of a steering wheel 38 from a reference position that is measured by and sent from a steering angle sensor 40 attached to a steering shaft of the steering wheel 38 manipulated to steer front wheels 32a and 32b, a gearshift position SP or the current position of a gearshift lever 52 that is detected by and sent from a gearshift position sensor 53, an accelerator opening Acc that corresponds to the driver's step-on amount of an accelerator pedal 54 and is measured by and sent from an accelerator pedal position sensor 55, a brake pedal position BP that corresponds to the driver's step-on amount of a brake pedal 56 and is measured by and sent from a brake pedal position sensor 57, and a vehicle speed V that is measured by and sent from a vehicle speed sensor 58.

In the automobile 20 of the embodiment constructed as discussed above, the gearshift position sensor 53 and the accelerator pedal position sensor 55 respectively detect the driver's change-speed operation of the gearshift lever 52 and the driver's step-on action of the accelerator pedal 54. The engine 22 and the automatic transmission 28 are controlled to ensure output of a driving force corresponding to the driver's change-speed operation and the driver's accelerator step-on action to the rear wheels 36a and 36b, based on the measurements of gearshift position SP, accelerator opening Acc, and vehicle speed V. The automobile 20 of the embodiment controls pitching or longitudinal vibrations and rolling or lateral vibrations, which are respectively caused by a longitudinal force (cornering drag) and by a lateral force arising in the vehicle corresponding to the driver's manipulation of the steering wheel 38. Control of such pitching and rolling is described below (hereafter referred to as turning-state motion control).

Figure 2:
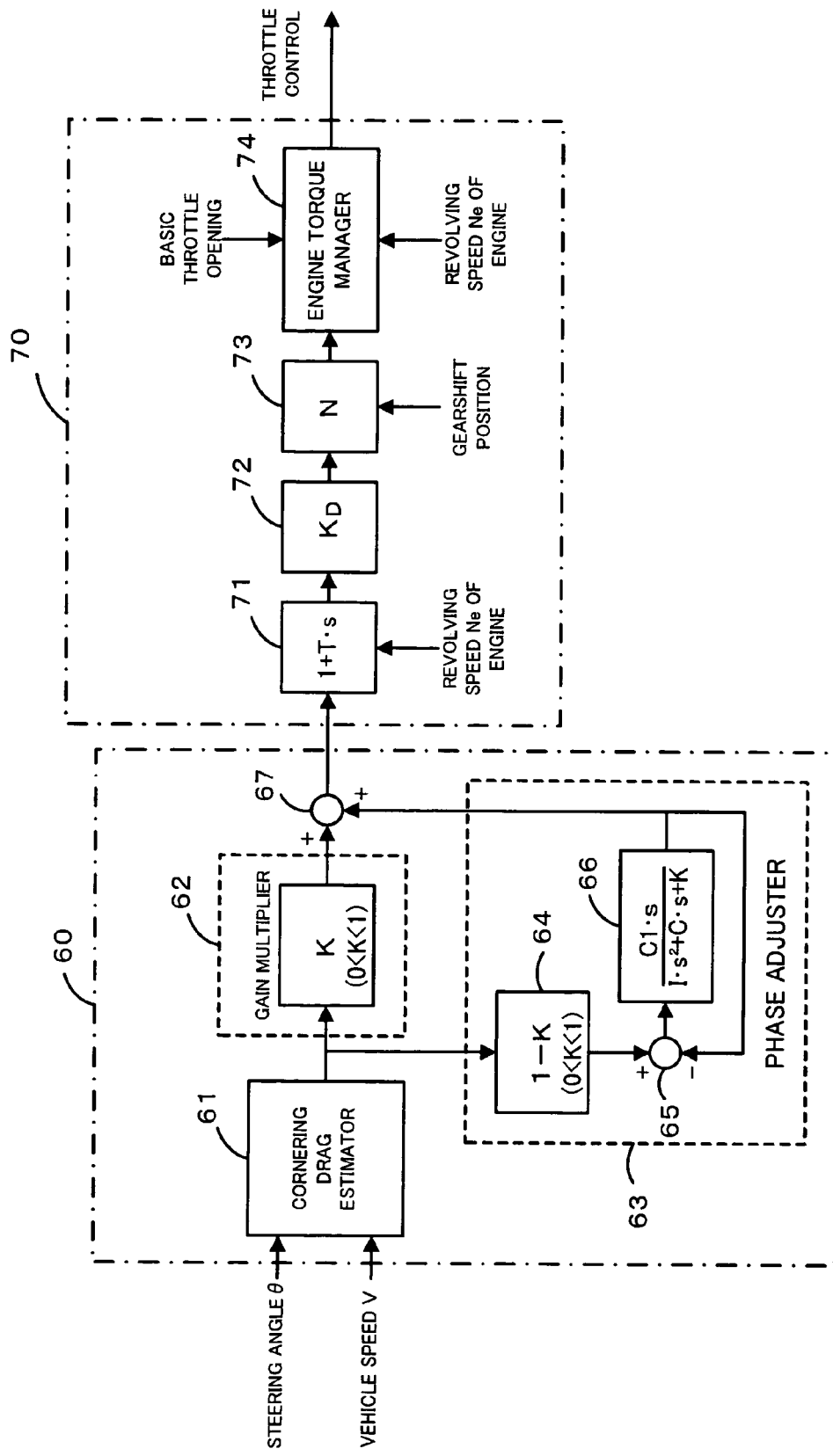
FIG. 2 is a block diagram showing control blocks involved in turning-state motion control.

FIG. 2 is a block diagram showing control blocks involved in the turning-state motion control. The turning-state motion control includes a control value calculation system 60 that calculates and sets a control value used to control pitching and rolling according to the measurements of steering angle $\theta$ and vehicle speed V, and an implementation system 70 that implements control of the engine 22 as the driving source according to the control value calculated and set by the control value calculation system 60.

The control value calculation system 60 includes a cornering drag estimator 61 that estimates a cornering drag from the measurements of steering angle $\theta$ and vehicle speed V, a gain multiplier 62 that multiplies the estimated cornering drag by a preset gain K to reduce the cornering drag estimated by the cornering drag estimator 61, a phase adjuster 63 that adjusts the phase of the rest of the estimated and reduced cornering drag, and an adder 67 that sums up the output from the gain multiplier 62 and the output from the phase adjuster 63.

Figure 3:
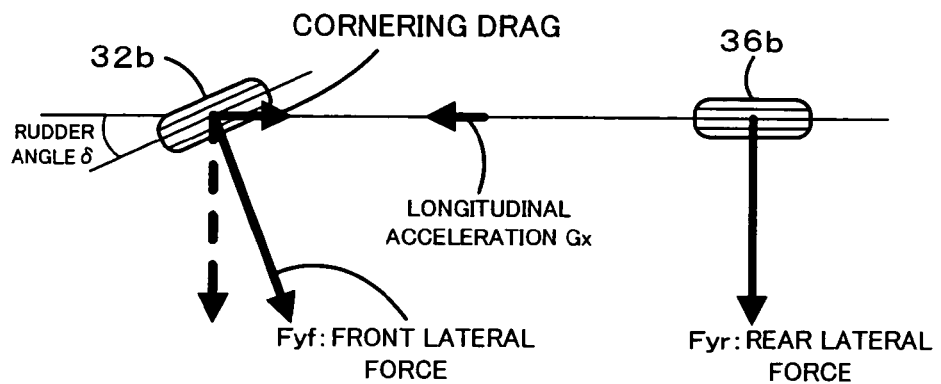
FIG. 3 shows a cornering drag.

In this embodiment, the cornering drag estimator 61 specifies in advance a variation in cornering drag against the steering angle $\theta$ and the vehicle speed V in the automobile 20 and stores the specified variation in the form of a map. The cornering drag corresponding to the inputs of the steering angle $\theta$ and the vehicle speed V is read from the stored map. As shown in FIG. 3, the cornering drag is a vehicle longitudinal component of a lateral force Fyf acting on the front wheels 32a and 32b when the driver's manipulation of the steering wheel 38 gives a rudder angle $\delta$ on the front wheels 32a and 32b. The cornering drag is thus given by $\sin\delta \cdot Fyf$. The lateral force Fyf is ascribed to the centrifugal force of the vehicle and is calculated dynamically from the angular velocity of the turning vehicle and the mass (weight) of the vehicle. The procedure of this embodiment uses the vehicle speed V and the steering angle $\theta$ of the steering wheel 38, which corresponds to the rudder angle $\delta$ on the front wheels 32a and 32b, in place of the angular velocity of the turning vehicle. The variation in cornering drag against the angular velocity of the turning vehicle is essentially given as the variation in cornering drag against the steering angle $\theta$ and the vehicle speed V. The cornering drag is applied as a deceleration force to the vehicle. Division of the cornering drag by the mass of the vehicle gives an acceleration Gx in a longitudinal direction of the vehicle (hereinafter referred to as longitudinal acceleration). Estimation of the cornering drag is accordingly synonymous with estimation of the longitudinal acceleration Gx caused by steering. An increase in centrifugal force leads to an increase in angular velocity. The map used for estimation of the cornering drag accordingly gives an increase in cornering drag with an increase of the steering angle $\theta$ and an increase of the vehicle speed V.

The phase adjuster 63 includes an operator 64 that calculates the rest of the cornering drag estimated by the cornering drag estimator 61 and reduced by the gain multiplier 62, an equivalent pitch damper 66 that adjusts the phase, and a subtracter 65 that receives a feedback output from the equivalent pitch damper 66, subtracts the feedback output from the output of the operator 64, and outputs the difference to the equivalent pitch damper 66. The equivalent pitch damper 66 is expressed as a transmission function of Equation (1) given below:

[Equation 1]

$$\frac{C1 \cdot s}{I \cdot s^2 + C \cdot s + D} \quad (1)$$

where C1, I, C, D, and s respectively denote an additional damping coefficient, an inertia in pitching of the vehicle (pitch inertia), a viscosity, an elasticity, and a Laplace operator. A pitch angle φ or a rotational angle in pitching of the vehicle under application of the longitudinal acceleration Gx onto the vehicle is expressed as φ(s)/Gx(s) which is equal to Equation (1) with setting of a value '1' to the numerator. The feedback of the output from the equivalent pitch damper 66 eliminates the differential term. As mentioned above, estimation of the cornering drag is synonymous with estimation of the longitudinal acceleration Gx. The phase adjuster 63 accordingly adjusts the phase of the longitudinal acceleration Gx.

The implementation system 70 includes an air intake lag compensator 71 that corrects the control value output from the control value calculation system 60 with a revolution speed Ne of the engine 22 to compensate for a first order lag of the air intake into the engine 22, a driving force converter 72 that converts the output from the air intake lag compensator 71 into a driving force, an equivalent torque ratio operator 73 that calculates a target additional engine torque from the output of the driving force converter 72 and the gearshift position, and an engine torque manager 74 that calculates a throttle control from the output of the equivalent torque ratio operator 73, a basic throttle opening, and the revolution speed Ne of the engine 22.

In the structure of this embodiment, the center ECU 50 attains the control value calculation system 60 and the air intake lag compensator 71 and the driving force converter 72 of the implementation system 70, whereas the engine ECU 24 attains the equivalent torque ratio operator 73 and the engine torque manager 74 of the implementation system 70.

Figure 4:
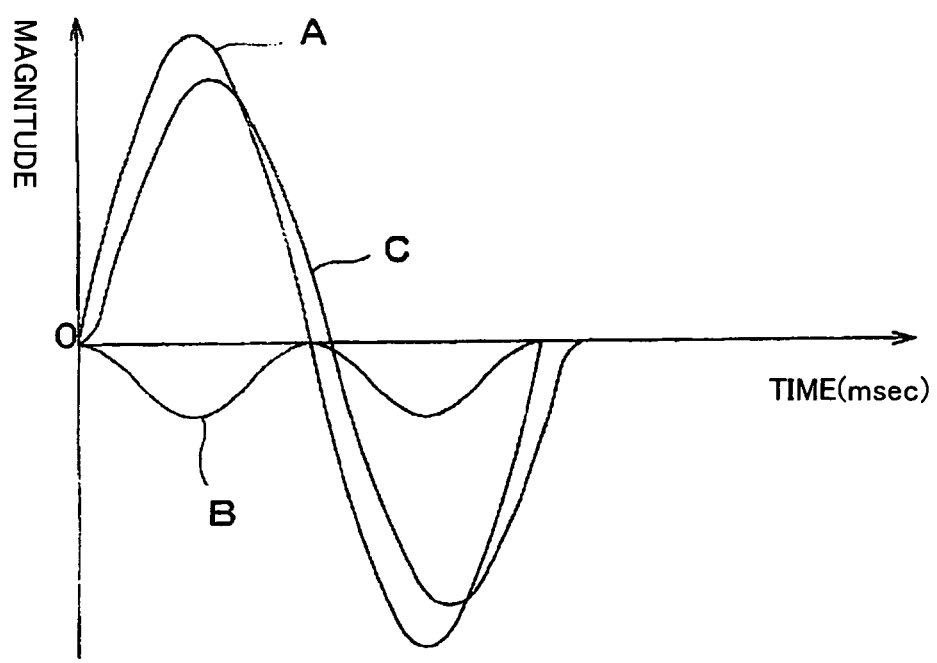
FIG. 4 shows a variation in rudder angle $\delta$, a variation in longitudinal acceleration Gx, and a variation in lateral acceleration Gy in the turning state against the time without the turning-state motion control.
Figure 5:
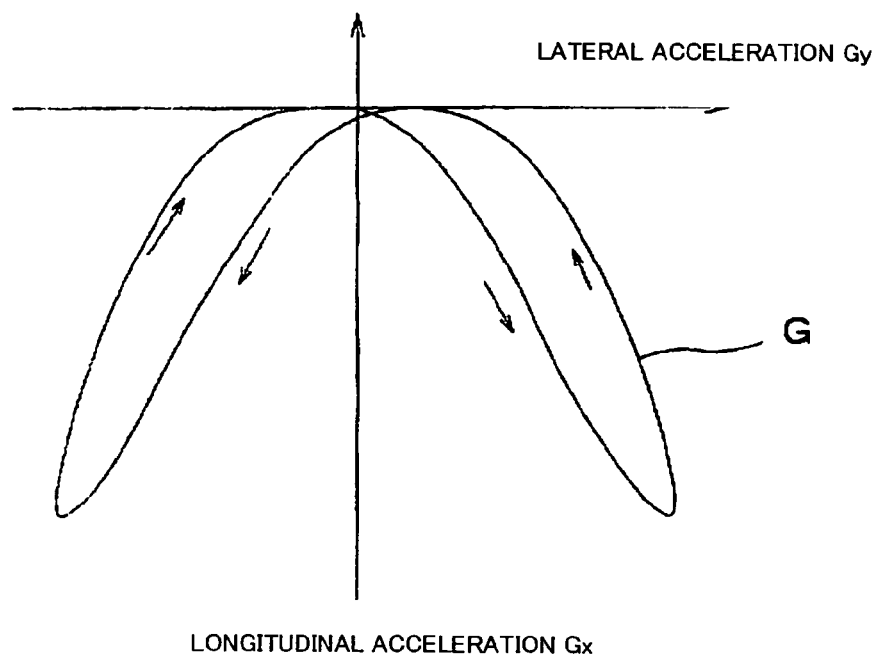
FIG. 5 shows a variation in longitudinal acceleration Gx against the lateral acceleration Gy in the turning state without the turning-state motion control.
Figure 6:
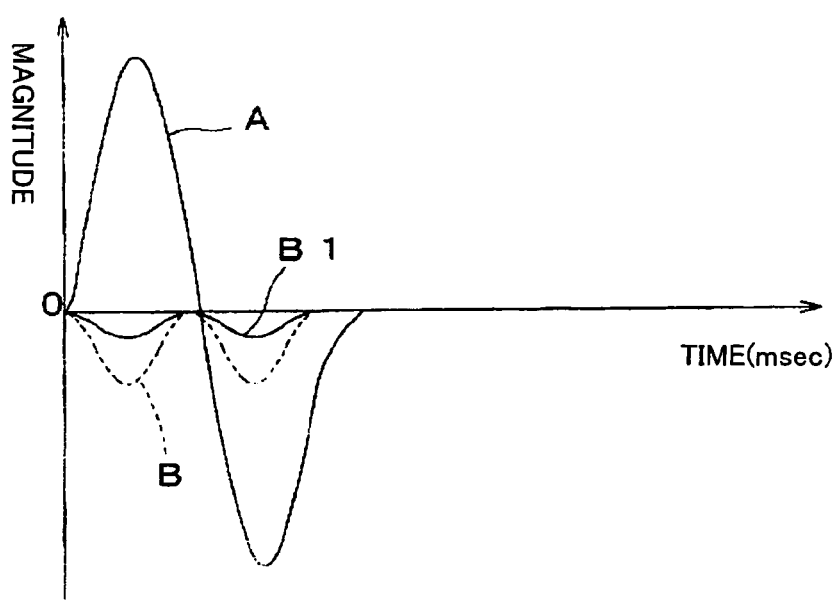
FIG. 6 shows a variation in rudder angle $\delta$ and a variation in longitudinal acceleration Gx in the turning state against the time on the condition that an effective value is set to only a gain K.
Figure 7:
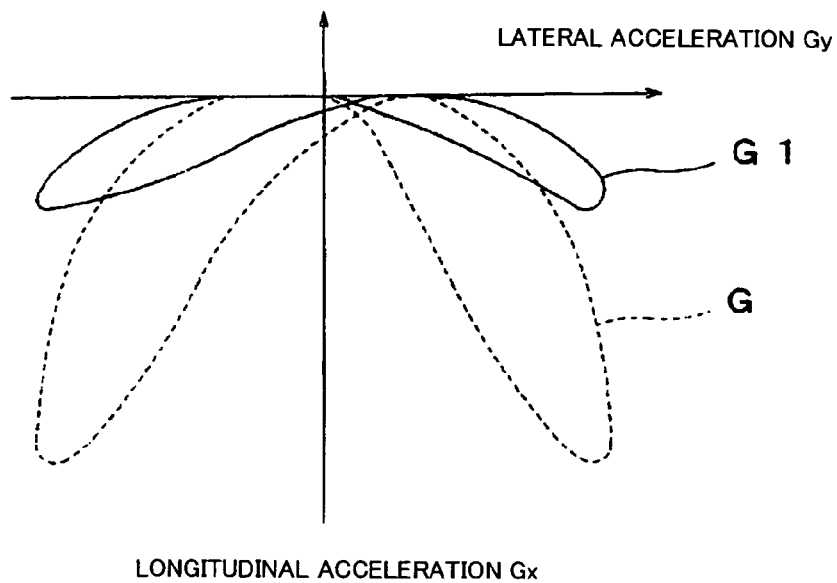
FIG. 7 shows a variation in longitudinal acceleration Gx against the lateral acceleration Gy in the turning state on the condition that the effective value is set to only the gain K.
Figure 8:
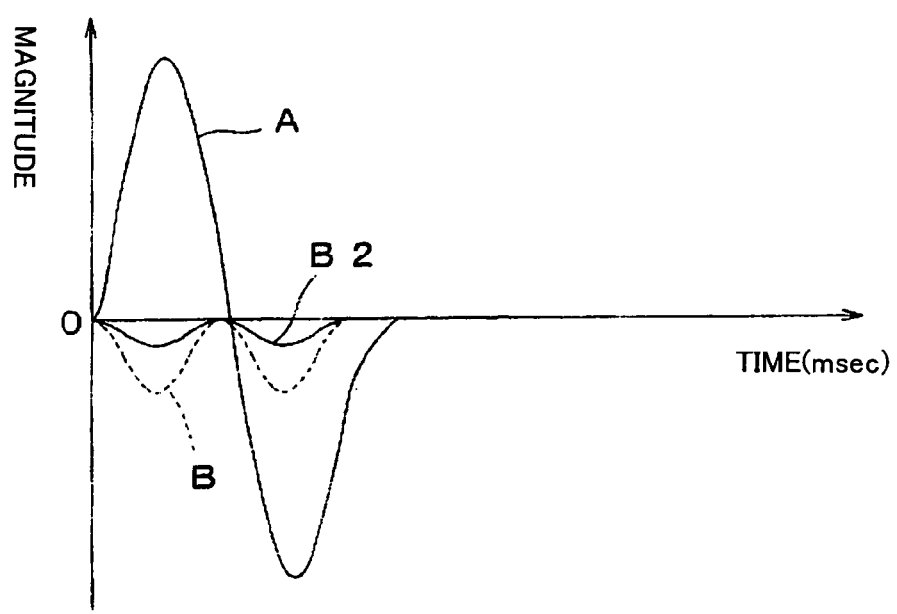
FIG. 8 shows a variation in rudder angle $\delta$ and a variation in longitudinal acceleration Gx in the turning state against the time on the condition that an effective value is set to only an additional damping coefficient C1.
Figure 9:
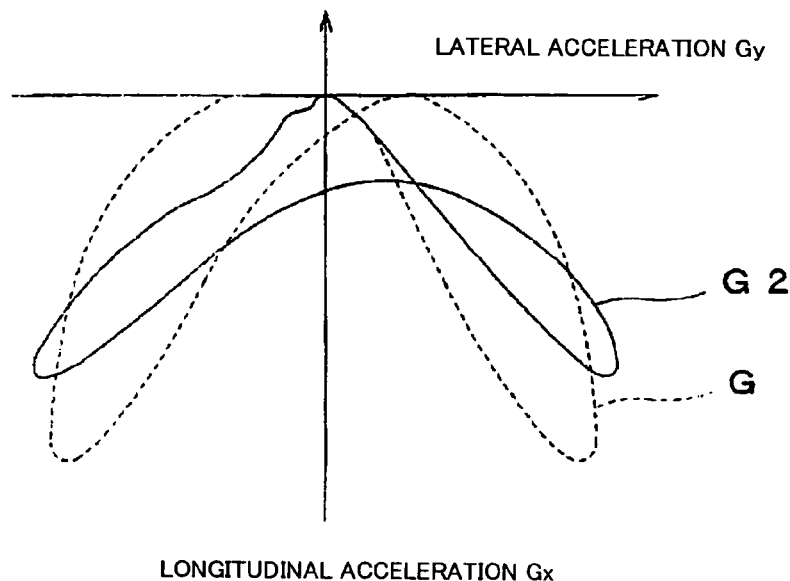
FIG. 9 shows a variation in longitudinal acceleration Gx against the lateral acceleration Gy in the turning state on the condition that the effective value is set to only the additional damping coefficient C1.

The following describes the principle of the turning-state motion control of the control value calculation system 60 and the implementation system 70 to control pitching and rolling of the vehicle with reference to concrete examples. The turning-state motion control regulates the gain K set in the gain multiplier 62 and the additional damping coefficient C1 set in the equivalent pitch damper 66 in the control value calculation system 60 to adjust the phase and the degree of reduction of the cornering drag estimated by the cornering drag estimator 61, that is, the phase and the magnitude of the longitudinal acceleration Gx of the vehicle in the turning state. For example, varying the gain K with fixation of the additional damping coefficient C1 to a value '0' adjusts only the magnitude of the longitudinal acceleration Gx without changing the phase of the longitudinal acceleration Gx. Varying the additional damping coefficient C1 with fixation of the gain K to a value '0', on the other hand, adjusts only the phase of the longitudinal acceleration Gx without changing the magnitude of the longitudinal acceleration Gx. The graph of FIG. 4 shows a variation in rudder angle δ (curve A), a variation in longitudinal acceleration Gx of the vehicle (curve B), and a variation in lateral acceleration Gy of the vehicle (curve C) in the turning state against the time without the turning-state motion control. The graph of FIG. 5 shows a variation in longitudinal acceleration Gx against the lateral acceleration Gy (curve G) on the condition of FIG. 4. The graph of FIG. 6 shows a variation in rudder angle δ (curve A) and a variation in longitudinal acceleration Gx of the vehicle (curve B1) in the turning state against the time on the conditions that the additional damping coefficient C1 is fixed to the value '0' and that an effective value is set to the gain K. The graph of FIG. 7 shows a variation in longitudinal acceleration Gx against the lateral acceleration Gy (curve G1) on the conditions of FIG. 6. The graph of FIG. 8 shows a variation in rudder angle δ (curve A) and a variation in longitudinal acceleration Gx of the vehicle (curve B2) in the turning state against the time on the conditions that the gain K is fixed to the value '0' and that an effective value is set to the additional damping coefficient C1. The graph of FIG. 9 shows a variation in longitudinal acceleration Gx against the lateral acceleration Gy (curve G2) on the conditions of FIG. 8. The broken curve B in FIGS. 6 and 8 shows the variation in longitudinal acceleration Gx without the turning-state motion control, and the broken curve G in FIGS. 7 and 9 shows the variation in longitudinal acceleration Gx against the lateral acceleration Gy without the turning-state motion control. As shown in FIG. 4, when the driver manipulates the steering wheel 38 to vary the rudder angle δ in a sine curve, the longitudinal acceleration Gx varies to have negative values with the variation in rudder angle δ. The lateral acceleration Gy then varies in a sine curve with a little phase delay from the variation in longitudinal acceleration Gx. The phase delay of the lateral acceleration Gy gives a diagonal variation in longitudinal acceleration Gx against the lateral acceleration Gy as shown in FIG. 5. On conditions that the additional damping coefficient C1 is fixed to the value '0' and that the effective value is set to the gain K, the longitudinal acceleration Gx is reduced as shown in the curve B1 of FIG. 6 and the curve G1 in FIG. 7. On conditions that the gain K is fixed to the value '0' and that the effective value is set to the additional damping coefficient C1, on the other hand, the phase of the longitudinal acceleration Gx is adjusted. This leads to reduction of the longitudinal acceleration Gx as shown in the curve B2 of FIG. 8 and deforms the diagonal variation as shown in FIG. 9. Regulation of the gain K may completely eliminate the longitudinal acceleration Gx. Regulation of both the gain K and the additional damping coefficient C1 may adjust the diagonal variation in longitudinal acceleration Gx against the lateral acceleration Gy.

Figure 10:
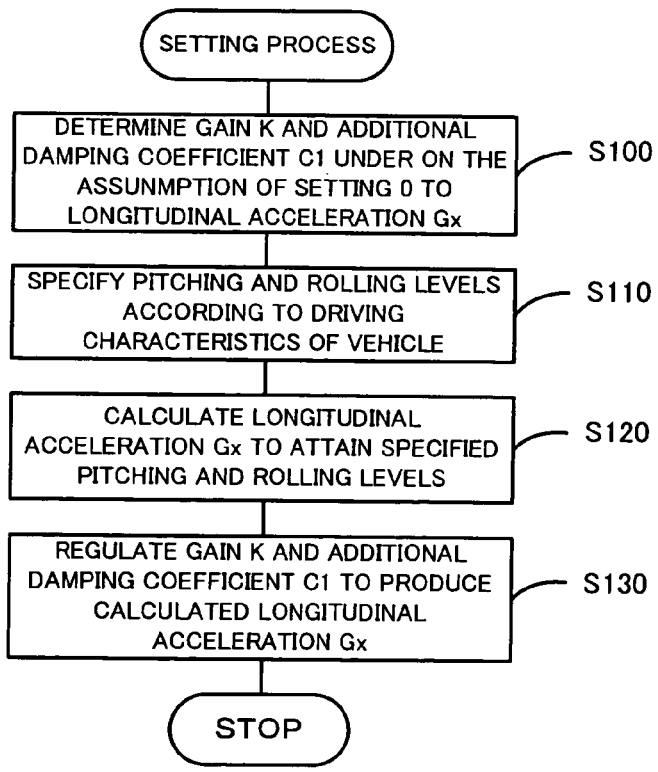
FIG. 10 is a flowchart showing a setting process of the gain K and the additional damping coefficient C1.

The automobile 20 of the embodiment sets the gain K and the additional damping coefficient C1 to reduce both the levels of pitching and rolling from those without the turning-state motion control, that is, to attain the adequate levels of pitching and rolling by steering of the steering wheel 38. The gain K and the additional damping coefficient C1 are set according to the driving characteristics of the automobile 20, for example, emphasis on the sporty drive or emphasis on the comfortable ride. A setting process shown in the flowchart of FIG. 10 may be applied to set the gain K and the additional damping coefficient C1. The setting process first determines the gain K and the additional damping coefficient C1 on the assumption of setting the value '0' to the longitudinal acceleration Gx (step S100), and specifies the pitching and rolling levels according to the driving characteristics of the vehicle (step S110). The setting process then calculates the longitudinal acceleration Gx to attain the specified pitching and rolling levels (step S120) and regulates and sets the gain K and the additional damping coefficient C1 to produce the calculated longitudinal acceleration Gx (step S130). This method regulates the gain K and the additional damping coefficient C1 to adjust the phase and the degree of reduction of the longitudinal acceleration Gx, but does not actually vary the longitudinal acceleration Gx to a desired level after setting of the value '0'. Such regulation of the gain K and the additional damping coefficient C1 attains the adequate levels of pitching and rolling caused by steering of the steering wheel 38.

As described above, the automobile 20 of the embodiment adjusts the phase and the degree of reduction of the estimated cornering drag to attain the adequate levels of pitching and rolling of the vehicle in the turning state. The pitching and rolling levels are regulated according to the driving characteristics of the vehicle.

The automobile 20 of the embodiment has the center ECU 50 and the engine ECU 24. The center ECU 50 attains the control value calculation system 60 and the air intake lag compensator 71 and the driving force converter 72 of the implementation system 70, whereas the engine ECU 24 attains the equivalent torque ratio operator 73 and the engine torque manager 74 of the implementation system 70. In one possible modification, the center ECU 50 may attain only the control value calculation system, while the engine ECU 24 may attain the whole implementation system 70. In still another modification, the engine ECU 24 may attain both the control value calculation system 60 and the implementation system 70.

The automobile 20 of the embodiment has the engine 22 as the driving source of the vehicle, but may use a motor as the driving source of the vehicle. In the latter case, the implementation system 70 is modified to be suitable for the motor. The motor used as the driving source of the vehicle may be designed to directly output the driving force to wheels, for example, an in-wheel motor.

The automobile 20 of the embodiment adjusts the phase and the degree of reduction of the estimated cornering drag. One modified control may once eliminate the cornering drag and then produce a desired level of longitudinal acceleration Gx.

In the automobile 20 of the embodiment, the rear wheels 36a and 36b are drive wheels and the front wheels 32a and 32b are driven wheels. The technique of the invention is also applicable to an automobile having the front wheels 32a and 32b as drive wheels and the rear wheels 36a and 36b as driven wheels, as well as to an automobile having the front wheels 32a and 32b and the rear wheels 36a and 36b all as drive wheels.

The embodiment discussed above is to be considered in all aspects as illustrative and not restrictive. There may be many modifications, changes, and alterations without departing from the scope or spirit of the main characteristics of the present invention.

INDUSTRIAL APPLICABILITY

The technique of the invention is effectively applicable to automobile industries.

The invention claimed is:

1. An automobile driven with a driving force from a driving source, said automobile comprising:
    a deceleration force estimation module that estimates a deceleration force in a vehicle longitudinal direction, which is caused by steering of the vehicle and is applied to reduce speed of the vehicle;
    a control value calculation module that adjusts phases of a longitudinal acceleration in the vehicle longitudinal direction and a lateral acceleration in a vehicle lateral direction out of a steering-based acceleration, which is caused by steering of the vehicle and is applied to the vehicle, based on the estimated deceleration force, so as to calculate an adjustment control value that is used to adjust the steering-based acceleration; and
    a driving control module that drives and controls the driving source to ensure output of a driving force to an axle based on a drive change demand of the vehicle and the calculated adjustment control value.

2. An automobile in accordance with claim 1, wherein said control value calculation module comprises a magnitude regulator that regulates magnitude of the longitudinal acceleration in the vehicle longitudinal direction out of the steering-based acceleration,
    said control value calculation module calculating the adjustment control value, based on the regulation by said magnitude regulator.

3. An automobile in accordance with claim 2, wherein said magnitude regulator decreases the magnitude of the longitudinal acceleration.

4. An automobile in accordance with claim 2, wherein said magnitude regulator regulates the magnitude of the longitudinal acceleration to set at least one of a pitching level and a rolling level of the vehicle, which is caused by the steering-based acceleration, to a specified level.

5. An automobile in accordance with claim 2, wherein said magnitude regulator regulates the magnitude of the longitudinal acceleration to reduce at least one of a pitching level and a rolling level of the vehicle, which is caused by the steering-based acceleration.

6. An automobile in accordance with claim 1, wherein said control value calculation module lags the phase of the longitudinal acceleration relative to the phase of the lateral acceleration.

7. An automobile in accordance with claim 1, wherein said control value calculation module adjusts the phase of the longitudinal acceleration to set at least one of a pitching level and a rolling level of the vehicle, which is caused by the steering-based acceleration, to a specified level.

8. An automobile in accordance with claim 1, wherein said control value calculation module adjusts the phase of the longitudinal acceleration to reduce at least one of a pitching level and a rolling level of the vehicle, which is caused by the steering-based acceleration.

9. An automobile in accordance with claim 1, said automobile further comprising:
    a steering angle detection module that detects a steering angle; and
    a vehicle speed measurement module that measures a vehicle speed,
    wherein said deceleration force estimation module estimates the deceleration force, based on the detected steering angle and the measured vehicle speed.

10. An automobile in accordance with claim 9, wherein said deceleration force estimation module estimates the deceleration force to increase with an increase in the detected steering angle and to increase with an increase in the measured vehicle speed.

11. An automobile in accordance with claim 1, wherein the driving source includes at least one of an internal combustion engine and a motor.

12. An automobile control method of controlling an automobile, which is driven with a driving force from a driving source, said automobile control method comprising the steps of:
    (a) estimating a deceleration force in a vehicle longitudinal direction, which is caused by steering of the vehicle and is applied to reduce speed of the vehicle;
    (b) regulating magnitude and phase of a longitudinal acceleration in the vehicle longitudinal direction out of a steering-based acceleration, which is caused by steering of the vehicle and is applied to the vehicle, based on the estimated deceleration force, so as to calculate an adjustment control value that is used to adjust the steering-based acceleration; and (c) driving and controlling the driving source to ensure output of a driving force to an axle based on a drive change demand of the vehicle and the calculated adjustment control value.

13. An automobile control method in accordance with claim 12, wherein said step (b) calculates the adjustment control value to set at least one of a pitching level and a rolling level of the vehicle, which is caused by the steering-based acceleration, to a specified level.

14. An automobile control method in accordance with claim 12, wherein said step (b) calculates the adjustment control value to reduce at least one of a pitching level and a rolling level of the vehicle, which is caused by the steering-based acceleration.

* * * * *